May 15, 1934.  F. PHILLIPS  1,958,548
ANIMAL SNARE
Filed May 15, 1933
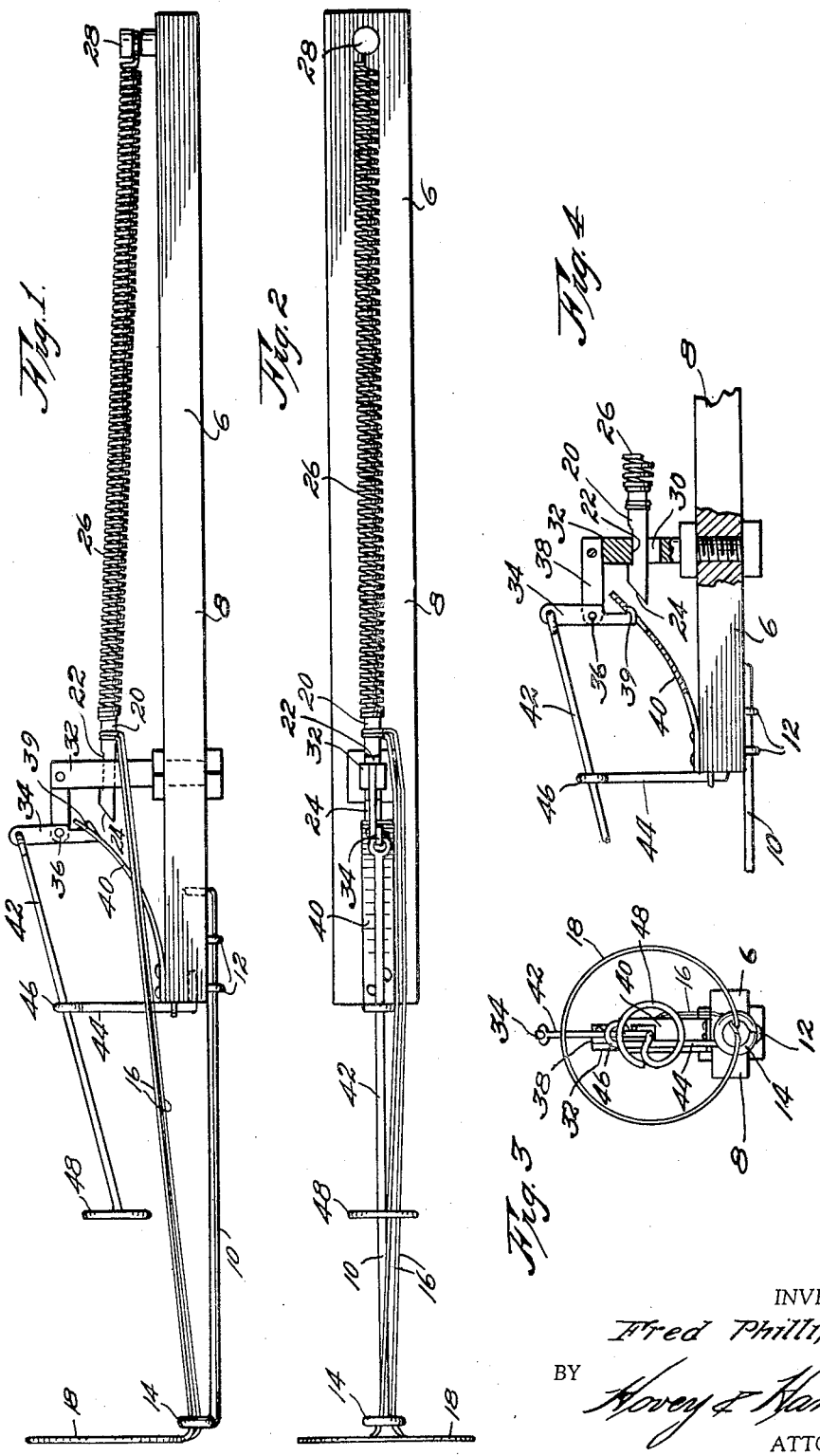
INVENTOR,
Fred Phillips.
BY
Hovey & Hamilton,
ATTORNEYS Patented May 15, 1934

1,958,548

UNITED STATES PATENT OFFICE 1,958,548

ANIMAL SNARE

Fred Phillips, Oak Grove, Mo., assignor of one-half to Samuel E. Cummins, Lees Summit, Mo.

Application May 15, 1933, Serial No. 671,107

4 Claims. (Cl. 43—87)

This invention relates to animal trapping appliances and has for a primary object, the provision of a snare that is particularly constructed for the purpose of trapping gophers in a way which will preclude the necessity of further work after the animal is caught, such as is the case where poison, shooting, gassing, and other methods are used where the animal is killed but not caught.

One of the important aims of this invention is the contemplation of an animal snare that is composed of a minimum number of parts and formed in a manner which permits introduction of the same directly into the runway formed in the earth by the animal, the snare having means for causing the release thereof disposable directly in the path of travel of the animal as it moves through the runway.

A further object of the invention is the provision of a snare of the character mentioned, wherein is embodied unique, novel, durable, and positively acting mechanism which will operate efficiently at all times and which requires no bait or parts other than the actual snare itself in trapping such animals as gophers.

In the drawing:

Figure 1 is a side elevation of an animal snare embodying this invention.

Fig. 2 is a top plan view of the same.

Fig. 3 is an end elevation, and,

Fig. 4 is an enlarged, detailed, fragmentary, sectional view through a portion of the releasable means.

All of the views in the drawing illustrate the animal snare in a set position, and the numeral 6 designates a base which comprises a wooden portion 8 and a portion 10 in the form of a longitudinally extending rod, one end of which is secured as at 12 to wooden portion 8, while the other end is formed to present an eye 14. It is through this eye 14 that a flexible snare cable or wire 16 is passed after it is rebent upon itself so that the bight forms a loop 18 beyond eye 14. The ends of cable 16 are secured to a tongue 20, having a notch 22 formed therein, and having an inclined end 24 created thereon for the hereinafter mentioned purpose. A retrieving spring 26 has one end secured to base 6 through pin 28, while the other end is joined to cable 16 through the medium of tongue 20. Cable, spring and tongue 16, 26 and 20 respectively are disposed in the relation shown in Fig. 1 so that said tongue 20 might project through opening 30 formed through support 32 carried by wooden portion 8 of base 6. In this manner notch 22 releasably engages support 32.

A trigger 34 pivotally mounted as at 36 upon a laterally projecting arm 38 of support 32 has a shoulder 39 formed on the lowermost end thereof which is brought into releasable engagement with a resilient tripping member 40, secured to base 6 as shown. When resilient tripping member 40 is set, trigger 34 will hold it securely against movement until slidable releasable element 42 is pushed to swing trigger 34 to a releasing position.

This last mentioned element 42 is joined to trigger 34 by suitable means and is slidably carried by standard 44 mounted on base 6. A bearing in the form of a loop or eye 46 serves the purpose of operably holding release element 42.

A bumper 48 formed on the end of element 42 is disposed on the axial center line of loop 18 and likewise directly within the runway when the trap is positioned to snare an animal. As bumper 48 is so positioned, loop 18 will extend around the wall of the runway and circumscribe the path of travel usually followed by the animal. Obviously, when the animal moves in through loop 18 and encounters bumper 48, trigger 34 will be moved to release tripping member 40 and tongue 20 will be struck thereby. Thus tensioned spring 26 will be released and a quick snapping closing of loop 18 will take place as spring 26 contracts. The animal will thereby be snared and held by the closing loop.

It is obvious that most of the parts of this animal snare should be made of corrosive proof material so that moisture from the earth will not set the parts against relative movement, because rod 10, eye 14, and other parts adjacent thereto are all below the surface of the earth when the trap is set.

I claim:

1. An animal snare comprising a base having an eye formed at one end thereof; a looped, flexible snare cable extending through said eye; a retrieving spring in connection with said cable; means to releasably maintain the spring under tension; and trip mechanism for the spring having a resilient member and means to hold the resilient member under tension, said resilient member being positioned to trip the said spring upon its release.

2. An animal snare comprising a base having an eye formed at one end thereof; a looped, flexible snare cable extending through said eye; a retrieving spring in connection with said cable; and means to releasably maintain the spring under tension comprising a pivotally mounted trigger, a resilient tripping member held under tension by the trigger when in the set position, and a slidably mounted release element joined to the trigger for rocking the same about its pivotal point, said resilient tripping member being adapted to trip said retrieving spring after being released by said trigger.

3. An animal snare comprising a base having an eye formed at one end thereof; a flexible snare cable rebent upon itself and extending through said eye to form a loop at the bight thereof; a retrieving spring having one end secured to the other end of said base; a notched tongue joining the inner, adjacent ends of said cable and spring; a standard on the base having an opening formed therethrough to receive the tongue; a trigger pivotally mounted on the standard; a resilient tripping member held under tension by said trigger; and a release element slidably carried by the base and joined to the said trigger for rocking the same about its pivotal point to free the tripping member.

4. An animal snare comprising a base having an eye formed at one end thereof; a flexible snare cable rebent upon itself and extending through said eye to form a loop at the bight thereof; a retrieving spring having one end secured to the other end of said base; a notched tongue joining the inner, adjacent ends of said cable and spring; a standard on the base having an opening formed therethrough to receive the tongue; a trigger pivotally mounted on the standard; a resilient tripping member held under tension by said trigger; and a release element slidably carried by the base and joined to the said trigger for rocking the same about its pivotal point to free the tripping member, said release element having an integral bumper at one end thereof disposed on the axis of said loop at a point spaced inwardly therefrom whereby when the animal snare is set the said bumper may be within the runway to form an obstruction and said loop may be circumscribing the path of travel of the animal to be snared.

FRED PHILLIPS.